United States Patent [19]

Kurth

[11] Patent Number: 5,742,991
[45] Date of Patent: Apr. 28, 1998

[54] METHOD FOR PRE-STRESSING BOLTS FOR CONNECTIONS, AND A DEVICE FOR EXECUTING IT

[75] Inventor: Erhard Kurth, Edingen, Switzerland

[73] Assignee: Fahr Bucher GmbH, Gottmadingen, Germany

[21] Appl. No.: 569,600

[22] Filed: Dec. 8, 1995

[30] Foreign Application Priority Data

Dec. 8, 1994 [DE] Germany ............... 44 43 661.0

[51] Int. Cl.$^6$ ................................. B21D 39/00
[52] U.S. Cl. ................ 29/452; 254/29 A; 425/589
[58] Field of Search ............. 29/446, 452; 254/29 A; 81/57, 38, 90, 2; 425/585, 595

[56] References Cited

U.S. PATENT DOCUMENTS

| | | |
|---|---|---|
| 3,364,546 | 1/1968 | Martin .................. 29/452 |
| 4,259,054 | 3/1981 | Savage . |
| 5,339,512 | 8/1994 | Odsberg et al. . |

FOREIGN PATENT DOCUMENTS

| | | |
|---|---|---|
| 476024 | 7/1915 | France . |
| 1 583 670 | 1/1971 | Germany . |

*Primary Examiner*—P. W. Echols
*Attorney, Agent, or Firm*—Burns, Doane, Swecker & Mathis, L.L.P.

[57] ABSTRACT

In presses for processing plastic materials, pre-stressing of pins (23) stressed by tension is preferably achieved by the use of the hydraulic press device via an auxiliary block instead by means of tightening stop nuts (20). After stressing a pressure plate (22) with a pressure force larger than the maximum operational load, gaps ($\Delta l$) are created between stops (31) on the pins (23) and the pressure plate (22) or counter-support flanges on a hydraulic cylinder. These gaps ($\Delta l$) are bridged in a frictionally connected manner by the adjustment of threaded rings (34), which have been inserted into bores (32) for the pins (23) in the pressure plate (22) or in the hydraulic cylinder. After the pressure plate (22) has been relieved of the pressure force, the required pre-tension is maintained.

11 Claims, 4 Drawing Sheets

5,742,991

METHOD FOR PRE-STRESSING BOLTS FOR CONNECTIONS, AND A DEVICE FOR EXECUTING IT

FIELD OF THE INVENTION

The invention relates to a method for pre-stressing bolts for connections which in operation are acted upon by tensile forces of determinable magnitude by means of a force transfer element clamped between a stop nut and a stop. In particular, the invention relates to pre-stressing pins in presses for processing plastic materials. The invention also relates to a device for executing the method.

BACKGROUND OF THE INVENTION

A method for pre-stressing housing bolts is known from European Patent Publication EP-A1 0 566 547 (OVAKO) and its U.S.A. counterpart U.S. Pat. No. 5,339,512. This relates to bolts for housing covers of steam and gas turbines and of valves for such turbines, which are disposed in groups and parallel with each other in locations with restricted lateral accessibility. This method operates by attaching a bridge element to the end faces of ends of two or more support bolts provided with threads. In this case the support bolts are disposed on opposite sides of the bolt to be pre-stressed. Pre-stressing of this bolt is then accomplished by means of a hydraulic tensioning element disposed on the bridge element.

This method can only be used in connection with a defined arrangement of the bolts and requires the use of additional bridge elements and hydraulic tensioning elements.

OBJECT AND SUMMARY OF THE INVENTION

It is an object of the invention to provide a method for pre-stressing bolts for connections which in operation are acted upon by tensile forces of a determinable size by means of a force transfer element clamped between a support element and a stop. In the process the mentioned disadvantages and elaborate manual manipulations with clamping tools are to be avoided.

In accordance with the invention this object is attained in that a) the connection is made so that it is sufficient for being stressed with the operational forces, b) then the connection is stressed by means of the force transfer element with a tension force greater than the maximum operational load, c) a gap between the force transfer element and the stop is closed by a frictional connection by means of a filler element, and finally, d) the stress in accordance with b) is released again.

In connection with pre-stressing several bolts which are evenly stressed in operation it has been shown to be particularly advantageous if the stress is removed only after the gaps at all bolts have been closed. Further preferred embodiments are characterized in the claims.

The invention will be explained in detail in the following description and in the drawings representing exemplary embodiments.

DETAILED DESCRIPTION OF THE PREFERRED EMBODIMENTS

Figure 1:
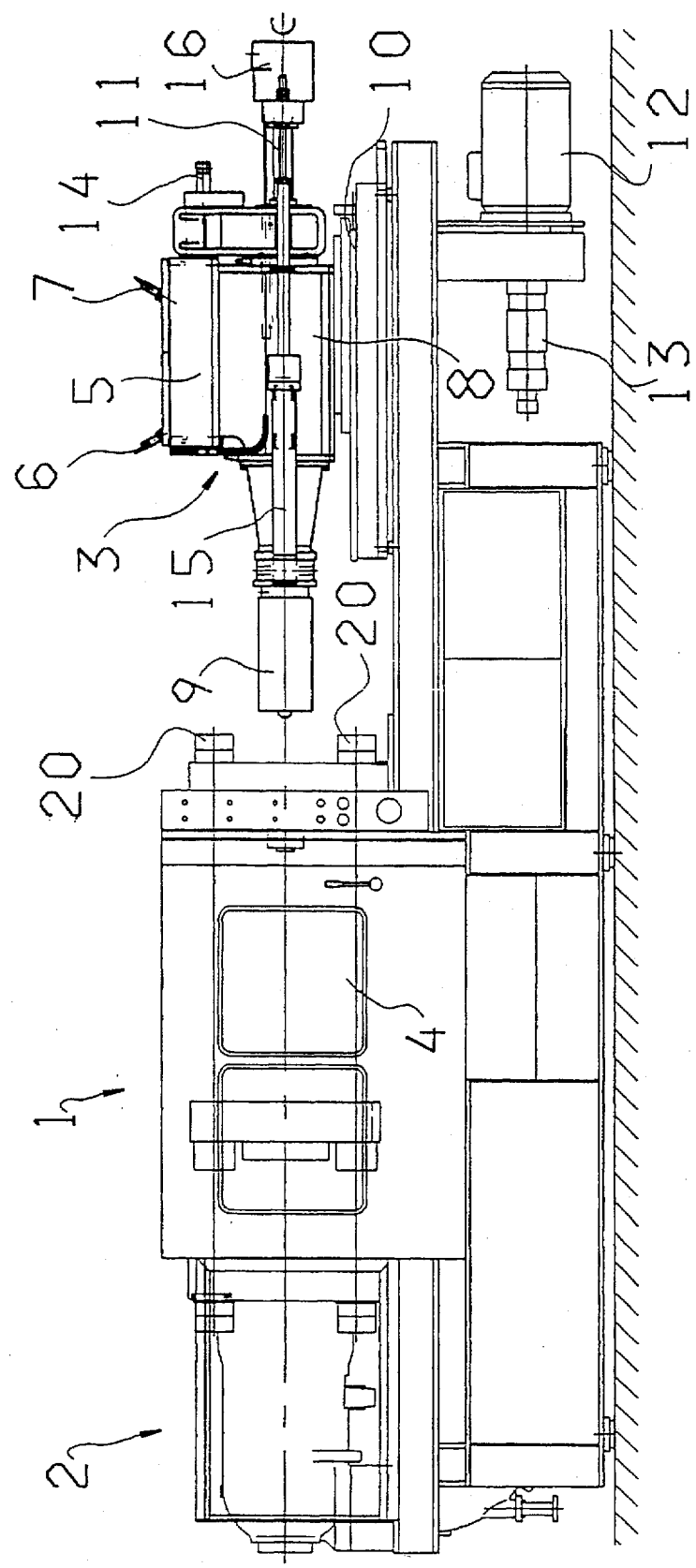
FIG. 1 is a side view of an injection molding installation for products made of plastic, having a charging unit, a molding unit and mold positioning unit.

The injection molding installation represented schematically in FIG. 1 comprises a molding unit 1 for the insertion and retention of an injection mold (not shown), a positioning unit 2 for one part of the injection mold and a unit 3 for charging the injection mold with material to be injected, for example polyester material charged with glass fibers. The unit 2 comprises four pins or bars which are acted upon with tensile forces of adjustable magnitude; it is therefore also known as a molding press.

In the molding unit 1, an injection mold, not shown, is mounted in an opening 4. This injection mold comprises two parts which enclose a hollow space for the material to be injected. The first part is mounted on the side facing the charging unit 3 and has an injection opening for the polyester material. The second part of the injection mold is opposite the first part and can be moved against the first part by a hydraulic device in the positioning unit 2 for sealing it against the first part by means of a pressure force. After finishing of the product, the second part of the injection mold is retracted again and the finished product is ejected. As described in detail in connection with FIGS. 2 and 3, the first part of the injection mold is fastened on the charging side to a pressure plate 22, which in turn is clamped on four pins 23 by means of stop nuts 20.

The charge unit 3 comprises a fill container 5 for the material to be injected, on which two sensors 6, 7 for the filling level are disposed. The material to be injected is conveyed to an injection unit 9 by means of a worm conveyor 8 connected to the fill container 5. For the injection process the charge unit 3 is moved on a base 10 to the injection mold attached to the molding unit 1. Subsequently the material to be injected is injected into the injection mold from the injection unit 9 by means of an injection piston 11.

A hydraulic pump 13, driven by an electric motor 12, is provided for driving the movement and conveying elements of the charge unit 3, as shown in FIG. 1. Supply lines, not shown, lead from this pump 13 to a drive motor 14 for the worm conveyor 8, to two hydraulic cylinders 15 for the linear drive of the injection piston 11 and to a motor 16 for operating the plasticizing worm of the injection piston 11.

Figure 2:
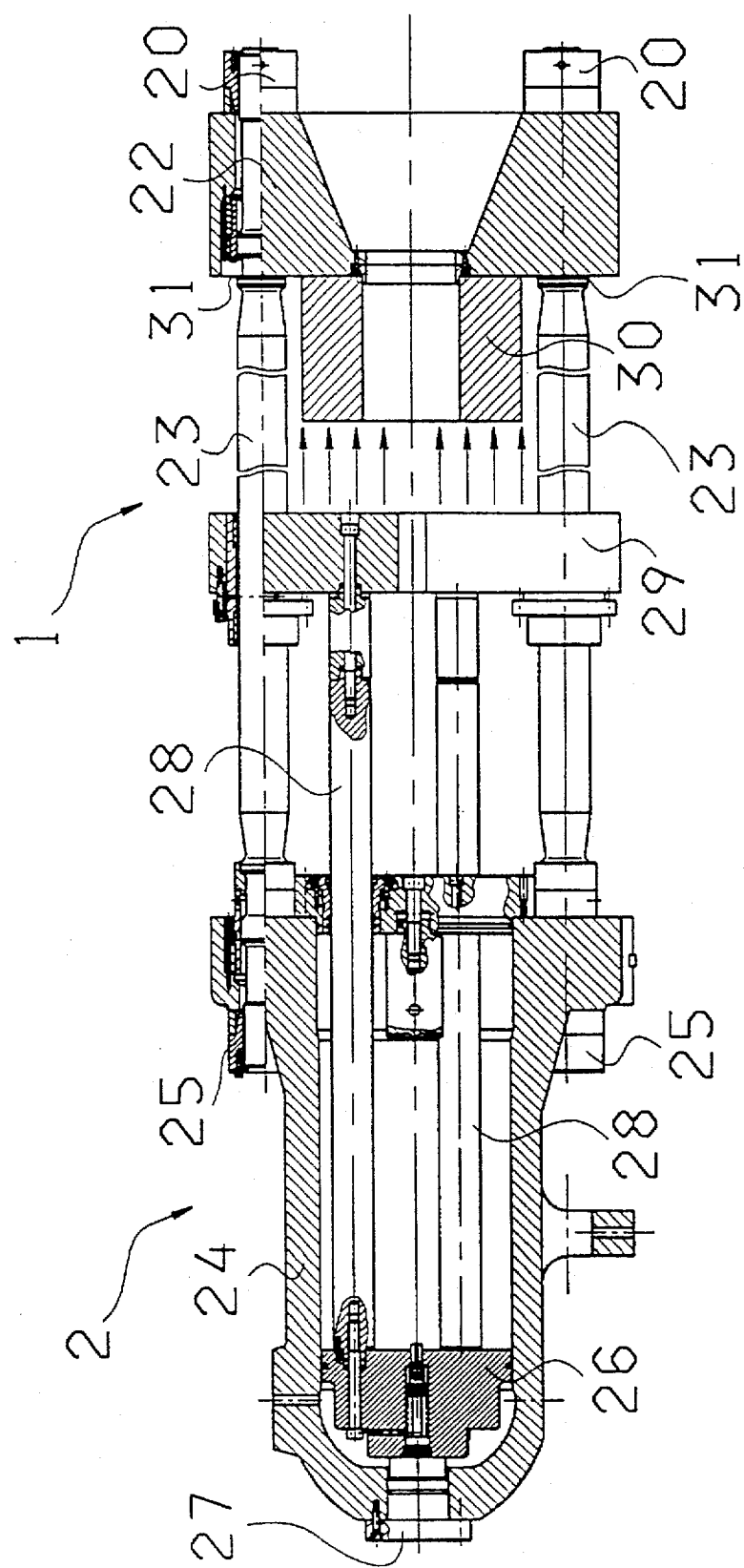
FIG. 2 is a partial sectional view of a molding unit and mold positioning unit in accordance with FIG. 1.

The partial sectional view of a molding unit 1 and mold positioning unit 2 in accordance with FIG. 2 shows a pressure plate 22 fixed in place. This plate is fastened to four pins 23 by means of stop nuts 20 (see FIG. 1) clamping against stops 31 on the pins 23. The pins 23 also are connected by stop nuts 25 at their opposite end portions to a stationary hydraulic cylinder 24 forming part of the positioning unit 2 for moving the moveable part of the injection mold. Thus, the pins 23 connect the pressure plate 22 with the hydraulic cylinder 24.

A piston 26 is located in the hydraulic cylinder 24 and is driven via a feed opening 27 in the hydraulic cylinder 24. The piston 26 is connected via push rods 28 with a movable pressure plate 29, which is guided on the pins 23 for sliding movement toward and away from the plate 22.

As already indicated in connection with FIG. 1, in the operating condition of the injection molding installation, one part of an injection tool which, however, is not shown, is fastened on the stationary pressure plate 22 and the opposing part is fastened to the moveable plate 29. In place of such an injection mold, FIG. 2 shows an auxiliary block 30 fastened on the plate 22. Thus the pins 23 can be tensioned to an adjustable degree by moving the piston 26 (and the plate 29 fixed thereto by push rods 28) to the right in FIG. 2 to bear against the block 30 and apply forces tending to move the plate 22 to the right. The plate 22 is clamped as a force transfer element between the stop nuts 20 and the stops 31 on the pins 23.

Figure 3A:
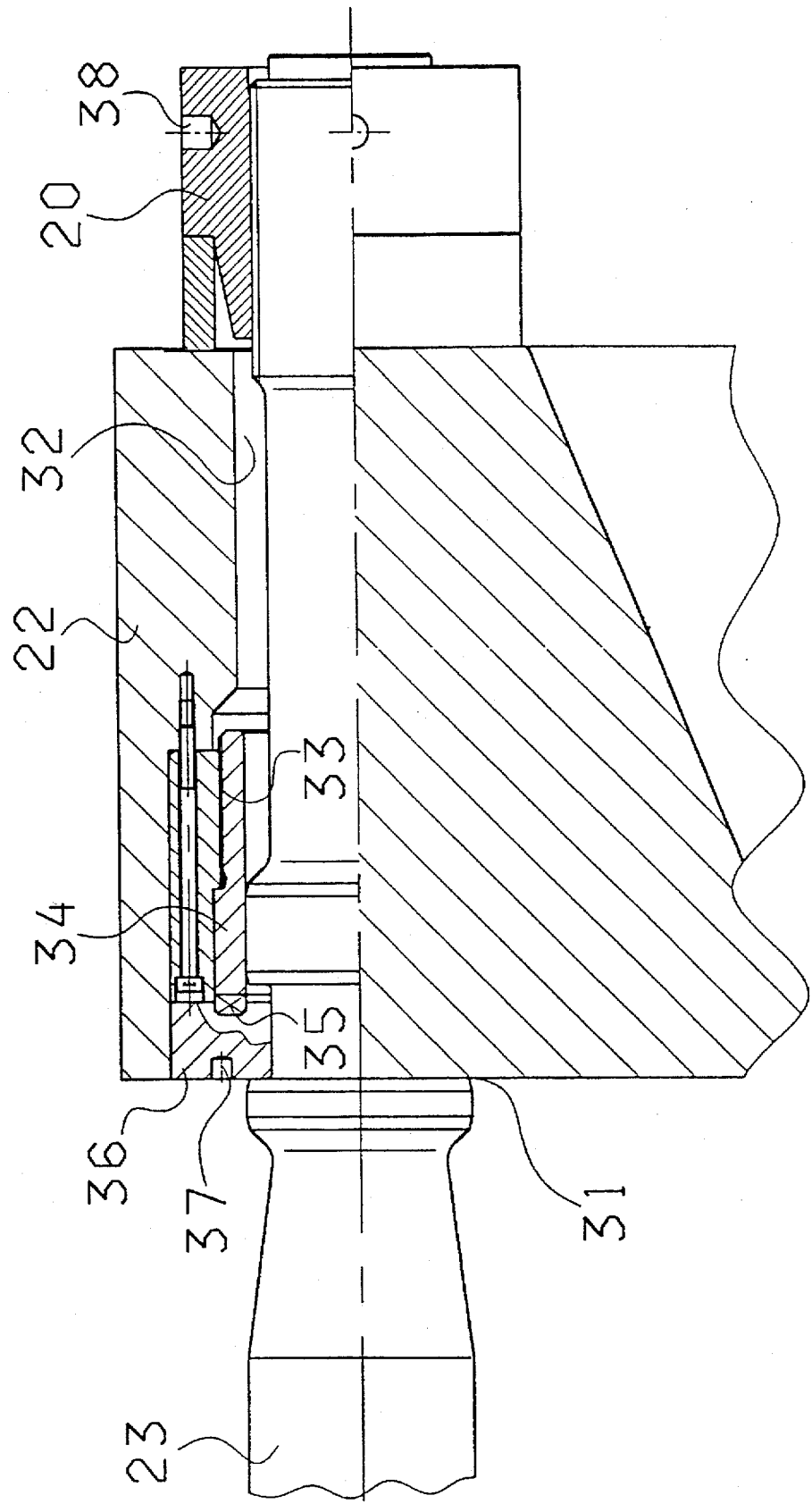
FIG. 3a is a partial sectional view of a mold unit in accordance with FIG. 2 with an adjustable insert in accordance with the invention and a pin which was not pre-stressed.

FIG. 3a shows in a partial sectional view an enlarged representation of the stationary plate 22 between a stop nut 20 and a stop 31 on a pin 23 in accordance with FIG. 2. It can be seen that the pin 23 is passed through a bore 32 in the plate 22. On the side facing the stop 31, a threaded ring 34 is screwed into a part of the bore 32 provided with a thread 33. The threaded ring 34 engages via dogs 35 a pre-seated divided ring 36, by means of which it can be connected in an adjustable and force-locking manner with the stop 31 on the pin 23. The divided ring 36 has cutouts 37 for receiving an adjustment tool.

It is assumed in FIG. 3a that the screw connection between the stop nuts 20 and the pins 23 has been provided to such an extent that it can be acted upon with the operating force by the piston 26 in accordance with FIG. 2. Such a screw connection is possible without any great input of force by means of a manual tool via a recess 38 provided on the stop nut 20 for this purpose. In the partial sectional view of FIG. 3b corresponding to FIG. 3a, the plate 22 is now stressed by the piston 26 with a force greater than the maximum operational load. As FIG. 2 in particular shows, this load results in a tension of the four pins 23, which is applied to the stop nuts 20, 25 by the plate 22 and the hydraulic cylinder 24.

Figure 3B:
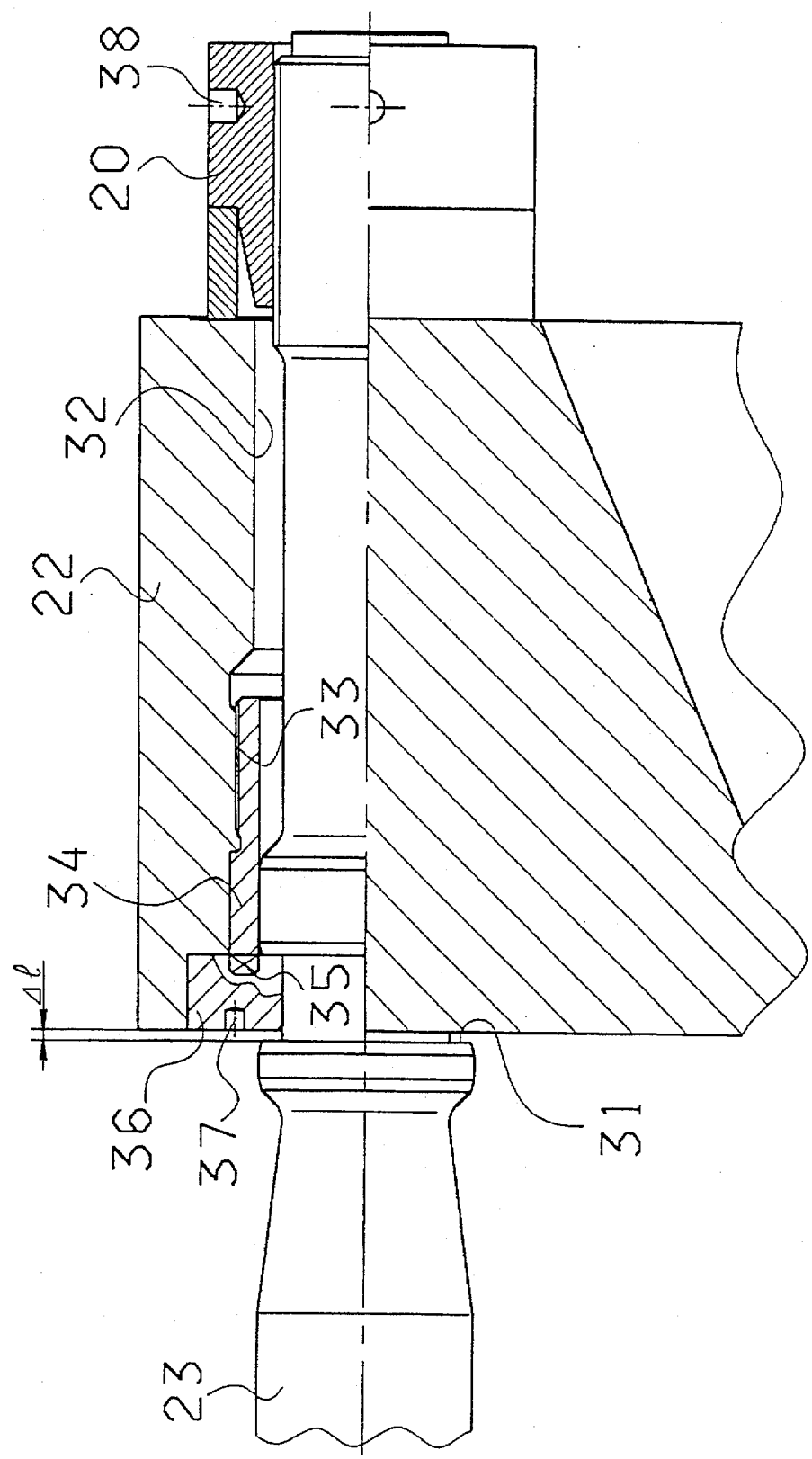
FIG. 3b is a partial sectional view of a mold unit in accordance with FIG. 2 with an adjustable insert in accordance with the invention and a pre-stressed pin.

This tension results in a stretching of the pins 23 in their area between the stop nuts at their ends. As FIG. 3b shows, a gap of a width Δl, which corresponds to a desired pre-stress of the pin 23, is created between the stop 31 and the pre-seated divided ring 36 by the stretching in this partial area of the pin 23 between the stop 31 and the stop nut 20. By means of the mentioned stress of the plate 22, such pre-stresses and gaps result evenly in the corresponding partial areas of all four pins 23.

Next the generated gaps of a width Δl are closed in a frictionally connected manner by turning out the threaded ring 34 by means of the pre-seated divided ring 36. As can be understood from the arrangement shown in FIG. 2, four more such gaps will be created during the pre-stressing operation. These will be located at the opposite end portions of the pins 23 cooperating with the fixed cylinder 24. Comparable insert structures are provided at these opposite end portions of the pin 23 and the additional gaps also are closed in a corresponding frictionally connected manner, which is not shown in detail. After that the stress on the auxiliary block 30 is released.

This stress must be selected to be large enough so that after its removal a pre-stress remains at the said end areas of the pins 23 which is greater than the tension which is created by the normal operational load during the maximum operation of the press. When such operational loads are applied, the connections between the divided rings 36 and the pin stop 31 are relieved, which results in a negligible additional stretching of the pre-stressed pin area. Since this additional stress is much less than the corresponding operational stretching occurring without pre-stress, the pre-stressed pin areas in particular, which are subjected to a notch effect, such as the threads of the support nuts 20, 25, are much less stressed. This advantage is, in a manner known per se, the reason why pre-stresses on bolts are used.

Persons skilled in the art will understand that the invention is not limited to the above described exemplary embodiments. It can be advantageous to embody the insert at the stationary pressure plate 22 not formed as a threaded ring 34, but as a spacer of a suitable preselected thickness, in order to avoid a further stressed thread 33 in the bore 32 of the plate 22. It is even possible to replace the support nuts 20, 25 on the pins 23 of the plastic press by unthreaded support parts, because the clamping function is taken over by the feed unit 2.

What is claimed is:

1. A method for pre-stressing bolts for apparatus connections which, during operation of the apparatus, are stressed with tensile operational forces of a determinable magnitude by way of a force transfer element clamped between a support element and a stop, comprising the steps of making a connection between the bolts and the support element that is able to withstand an applied load when stressed with the operational forces, pre-stressing the connection with a tension force by way of the force transfer element to create a gap between the force transfer element and the stop, closing said gap through operation of a filler element that is operatively associated with the force transfer element, and, releasing the stress applied in the pre-stressing step.

2. A method in accordance with claim 1, wherein each of said bolts is provided with a respective stop, said step of pre-stressing including pre-stressing a plurality of bolts at the same time to create a gap between the force transfer element and the respective stop at each of a plurality of bolts, said step of releasing the stress being performed only when the gaps at all of the bolts are closed.

3. A method in accordance with claim 1, wherein the stress on the connection is applied from a mold part positioning means via a pressure plate acting as the force transfer element.

4. A method of pre-stressing at least one bolt in an apparatus provided with a force transfer element associated with said bolt in a manner to apply to said bolt tensile forces of determinable magnitude, said force transfer element being clamped between first and second stops on said bolts; said method comprising the steps:

making a connection between said first stop and said bolt sufficient to withstand tensile forces of said determinable magnitude, stressing said connection by moving said force transfer element toward said first stop with a force greater than a maximum load encountered during operation of said apparatus to elongate said bolt and form a gap between said second stop and said force transfer element, closing said gap by extending a filler device across said gap, and releasing the stress applied in said stressing step.

5. A device for pre-stressing a bolt for apparatus connections, comprising:

at least one bolt;

a support element secured to the at least one bolt;

a stop operatively associated with said at least one bolt;

a force transfer element mounted on the at least one bolt, the force transfer element being positioned between the support element and the stop;

an insert operatively associated with the force transfer element on a side of the force transfer element facing said stop for closing, through operation of the insert, a gap created between the force transfer element and said stop during pre-stressing of the at least one bolt by way of the force transfer element.

6. A device in accordance with claim 5, wherein said at least one bolt passes through a bore in the force transfer element, said insert being disposed in the bore and including an axially adjustable threaded ring.

7. A device in accordance with claim 5, wherein the at least one bolt has an exterior diameter and the threaded ring has an interior diameter that is greater than the exterior diameter of the at least one bolt.

8. A device in accordance with claim 7, wherein the stop includes a shoulder provided on the at least one bolt, and wherein the insert includes a divided ring placed on the at least one bolt.

9. A device in accordance with claim 5, wherein the apparatus is a press for processing plastic materials in a space between a fixed injection mold part and a movable injection mold part, said force transfer element being a pressure plate adapted to be fixed with respect to the fixed mold part, and including positioning means for moving said movable mold part.

10. Device in accordance with claim 5, wherein said support element includes a stop nut adjustably mounted on the at least one bolt by a screw connection.

11. Device in accordance with claim 5, wherein the at least one bolt includes a plurality of bolts each having a support element mounted thereon, said force transfer element including a bore through which the plurality of bolts extend.

\* \* \* \* \*